(12) United States Patent
Grubbs et al.

(10) Patent No.: US 7,877,426 B2
(45) Date of Patent: Jan. 25, 2011

(54) PERFORMANCE-ENHANCING SYSTEM AND METHOD OF ACCESSING FILE SYSTEM OBJECTS

(75) Inventors: Mark Allen Grubbs, Round Rock, TX (US); Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2008 days.

(21) Appl. No.: 10/621,951

(22) Filed: Jul. 17, 2003

(65) Prior Publication Data

US 2005/0015354 A1  Jan. 20, 2005

(51) Int. Cl.
*G06F 12/00* (2006.01)
*G06F 17/30* (2006.01)

(52) U.S. Cl. ...................... 707/830; 707/823
(58) Field of Classification Search ............. 707/2, 707/200, 823, 830
See application file for complete search history.

(56) References Cited

U.S. PATENT DOCUMENTS

| | | | | |
|---|---|---|---|---|
| 5,388,257 A * | 2/1995 | Bauer | ............................. | 707/1 |
| 5,437,029 A * | 7/1995 | Sinha | .......................... | 707/200 |
| 5,499,358 A * | 3/1996 | Nevarez | ....................... | 707/101 |
| 5,504,892 A * | 4/1996 | Atsatt et al. | ............. | 707/103 R |
| 5,566,331 A * | 10/1996 | Irwin et al. | .................... | 707/10 |
| 5,713,008 A * | 1/1998 | Falkner | ....................... | 711/118 |
| 5,742,817 A * | 4/1998 | Pinkoski | ..................... | 707/200 |
| 6,029,166 A * | 2/2000 | Mutalik et al. | ................. | 707/3 |
| 6,078,929 A * | 6/2000 | Rao | ............................ | 707/200 |
| 6,119,118 A * | 9/2000 | Kain et al. | ..................... | 707/10 |
| 6,697,846 B1 * | 2/2004 | Soltis | ......................... | 709/217 |
| 2003/0110190 A1 * | 6/2003 | Achiwa et al. | .............. | 707/203 |

OTHER PUBLICATIONS

Duchamp, Dan. "Optimistic Lookup of Whole NFS Paths in a Single Operation." UNENIX Summer 1994 Technical Conference, Jun. 6-10, 1994. 13 pages.*
Kleiman, Steve R. "Vnodes, an Architecture for Multiple File System Types in Sun UNIX." USENIX Summer 1986 Conference, Jun. 1986. 10 pages.*
Stern, Hal. "A File by Any Other Name." SysAdmin, SunWorld Online, Sep. 1995.*
Apparatus and Method of Creating a Mirroring Map for Use With Different Pieces of Data, By G. F. McBrearty et al., filed on Dec. 17, 2001, having U.S. Appl. No. 10/015,223.

* cited by examiner

Primary Examiner—Charles E Lu
(74) Attorney, Agent, or Firm—Matthew B. Talpis; James L. Baudino

(57) ABSTRACT

A performance-enhancing system and method of accessing file system objects are provided. The system and method entail determining a plurality of file system objects that are frequently being accessed. Each one of these file system objects has a pathname and an inode number. The inode number is used to locate the file system object on a storage system. The pathname of each file system object and its inode number are cross-referenced and cached. Having a whole pathname of a file cross-referenced with its inode number and entered into a memory allows the inode number to be obtained with one memory access instead of the many memory accesses that are usually required.

6 Claims, 10 Drawing Sheets

| PATHNAME | I-NODE # |
|---|---|
| / USR / LIB / LIBC.A | 3024 |
| / BAR / DIR1 / DIRA / FILE1 | 1015 |
| ○ | |
| ○ | |
| ○ | |

1405 → / USR / LIB / LIBC.A
1410 → / BAR / DIR1 / DIRA / FILE1

| I-NODE # | NAME |
|---|---|
| 1010 | VAR |
| 1012 | USR |
| ○ | ○ |
| ○ | ○ |
| ○ | ○ |

| I-NODE # | NAME |
|---|---|
| 2020 | BIN |
| 2022 | LIB |
| ○ | ○ |
| ○ | ○ |
| ○ | ○ |

| I-NODE # | NAME |
|---|---|
| 3020 | DOC |
| 3022 | ETC |
| 2024 | LIBC.A |
| ○ | ○ |
| ○ | ○ |
| ○ | ○ |

| I-NODE # | NAME |
|---|---|
| 1012 | USR —— 104 |
| 2022 | LIB —— 106 |
| 3024 | LIBC.A —— 108 |
| ○ | ○ |
| ○ | ○ |
| ○ | ○ |

MOUNT -O MENC=/DIRA/FILE1 /DEV/LV00 /BAR/DIR1
 /     /   _____/ _____/ _____/
905   910         915             920       925

FIG. 9

MENC /BAR/DIR1/DIRA/FILE1
 /    _____/
1005          1010

FIG. 10

MENC -P -M /BAR/DIR1 DIRA/FILE1
 /    |    _____/ _____/
1105  |       1115       1120
     1110

FIG. 11

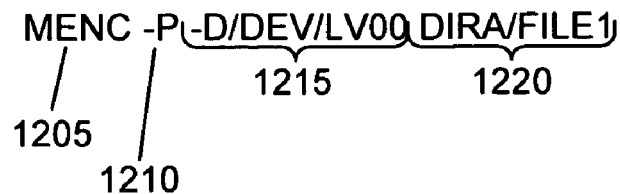
FIG. 12
FIG. 13
| PATHNAME | I-NODE # |
|---|---|
| / USR / LIB / LIBC.A | 3024 |
| / BAR / DIR1 / DIRA / FILE1 | 1015 |
| ○ | |
| ○ | |
| ○ | |
1405 → / USR / LIB / LIBC.A
1410 → / BAR / DIR1 / DIRA / FILE1
FIG. 14

PERFORMANCE-ENHANCING SYSTEM AND METHOD OF ACCESSING FILE SYSTEM OBJECTS

BACKGROUND OF THE INVENTION

1. Technical Field

The present invention is directed to file systems. More specifically, the present invention is directed to a performance-enhancing system and method of accessing file system objects.

2. Description of Related Art

In Unix file systems, a directory is considered to be a file and each file is associated with an index node or inode. An inode is a data structure that contains important information about the file with which it is associated. Information contained in an inode includes user and group ownership of the file, access permissions (e.g., read, write, execute permissions) and file type (e.g., regular, directory or device file). Further, the inode contains the date and time the file was created as well as the date and time of any modifications. In addition, the inode contains information regarding the location of the file on a disk or storage system. The inode is identified by a unique number called an inode number. Thus, to access a file on a disk, the file inode number must be known.

Users, however, do not access files using the files' inode numbers; rather, they use the files' symbolic names. Hence, a table is used in which files' symbolic names are cross-referenced with their inode numbers. This table is generally referred to as a directory.

Symbolic names are often in terms of pathnames. To obtain the inode number of a file referred to by its pathname (e.g./usr/lib/libc.a), a plurality of steps may occur. Particularly, the inode number of each element or "edge" of the pathname (e.g., usr, lib, libc.a) has to first be obtained from its parent directory. Note that in a UNIX-based system, pathnames are either absolute or relative. Absolute pathnames start with a root directory (i.e., "/" character) and relative pathnames start with a directory other than a root directory. Generally, this directory is a "current working" directory.

The inode number and thus the inode of either a root directory or a current working directory is ordinarily known to the system. The method by which these inodes are known to the system is implementation-dependent. For example, the inode number of the root directory may be stored in a global variable within the operating system of some systems. In other systems, it may be a specific number that is always the same for every installation. In yet other systems, the inode itself may be located at a specific location on a storage device. An inode number of a current working directory may be stored in some internal structure or a pointer to the location of the inode may be stored in memory by a running process or thread.

In any event, the system must perform a lookup of the first edge of the pathname within its parent directory (either the root directory for an absolute pathname or the current directory for a relative pathname). First, the contents of the parent directory are examined to cross-reference the edge name with its inode number. Next, using the inode number found, the inode is accessed and if the user has sufficient access permission and the edge is a directory, then a name lookup is performed of the next edge of the pathname in the directory just found. This process is repeated until the inode number for the last edge is determined, which is then returned to the process or thread performing the name lookup.

FIGS. 1 and 2 are used to illustrate the procedure outlined above. FIG. 1 is a partial directory tree which is used to locate file "libc.a" using pathname "/usr/lib/libc.a". As previously stated, the inode number of each element or edge (i.e., root directory "/" 102, sub-directories "usr" 104 and "lib" 106 and file "libc.a" 108) will have to be first obtained from the disk. This is done by first accessing the inode of the root directory "/" 102 whose inode number is known. When the inode of the root directory "/" 102 is accessed, the information in FIG. 2a will be made available.

FIGS. 2a, 2b and 2c are directories for the root directory "/" 102, sub-directories "usr" 104 and "lib" 106, respectively. Thus, in the root directory "/" 102, the inode number for each sub-directory and/or file within the root directory is cross-referenced with its name. There, it is seen that the inode number of the sub-directory "usr" is "1012". Upon accessing the inode of sub-directory "usr" 104 using inode number "1012", the inode numbers of the subdirectories (and files) in "usr" 104 will be made available (see FIG. 2b). Likewise, the inode numbers of all sub-directories and files in sub-directory "lib" 106 are made available in FIG. 2c. Hence, using the inode number "3024" of file "libc.a" the file's inode on the disk will become available.

Since directories are stored on disks, each inode access is a disk access. Generally to open a file, multiple disk accesses are required for every edge in the pathname. Particularly, one disk access is used to look up the edge name in the parent directory, another is used to access the inode for the edge and at least one more is used to access the content of the object being looked up. It is well understood in the art that disk accesses are more time-intensive than memory accesses. Thus, to increase performance, a directory name lookup cache (DNLC) is used.

The DNLC is a general file system service that caches the most recently referenced file names and their associated inode numbers. Consequently, after the inode number of the file "libc.a" is obtained, the DNLC will contain the information shown in FIG. 3. Thus, the DNLC can satisfy any subsequent request for any of the information contained therein. Therefore, when an application (e.g., a text editor or a compiler) tries to look up a file name or requests file data, the DNLC is first checked for the name of each directory/subdirectory or file in the pathname of the file. If the name is in the DNLC, the inode number will be obtained.

However, just as in the case of the disk, each name lookup is a DNLC access. Thus, in cases where a particular file is used by a plurality of other processes such that it is consistently being opened and closed, the system will access the DNLC as often as it would the disk in order to find the location of the file on the disk.

Hence, since each DNLC access consumes time, although not to the same extent as a disk access, it would therefore be advantageous to decrease the overhead associated with frequent lookups of particular pathnames.

SUMMARY OF THE INVENTION

The present invention provides a performance-enhancing system and method of accessing file system objects. The system and method entail determining a plurality of file system objects that are frequently being accessed. Each one of these file system objects has a pathname and an inode number. The inode number is used to locate the file system object on a storage system. The pathname of each file system object and its inode number are cross-referenced and cached. Having a whole pathname of a file cross-referenced with its inode number and entered into a cache allows the inode number to be obtained with one cache access instead of the many accesses that are usually required.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 displays a mount command with an option to enter a pathname of a file into a multi-edge name cache (MENC).

FIG. 10 is a command to enter a pathname into the MENC.

FIGS. 11 and 12 illustrate commands that may be used at any time to make persistent entries.

FIG. 13 depicts a removal command.

FIG. 14 displays representative entries into the MENC.

DETAILED DESCRIPTION OF THE PREFERRED EMBODIMENT

The invention is implemented using a multi-edge name cache (MENC) system. In an MENC, a pathname (multiple edges) of a file may be stored as a single entry in the cache. The file pathname will be cross-referenced to its inode number. When a process needs to open a file, the pathname of the file is checked against the entries in the MENC in order to obtain its inode number. If the pathname is in the MENC, the inode number of the file will be obtained with one MENC access. If the pathname is not in the MENC, then the DNLC and/or the disk may be consulted as customary. Note that in order not to obfuscate the disclosure of the invention, the pathname of a file will be used throughout the rest of the disclosure. However, it should be understood that the pathname may be to any file system object (e.g., directory, file, etc).

Since there may be anywhere from hundreds to thousands of files on a server, for example, entering pathnames of all the files, including their cross-referenced inode numbers, in the MENC may be quite unmanageable as well as counter-productive. Hence, only a subset of the files will be entered in the MENC. To take full advantage of the MENC, therefore, only pathnames of files that are accessed quite frequently should be entered in the MENC. For example, library file "libc.a" is accessed very frequently. Hence, entering its pathname "/usr/lib/libc.a" and its cross-referenced inode number in the MENC may enhance the performance of the computer system. A system administrator may, therefore, select and enter the pathnames of these frequently-used files in the MENC.

A UNIX computer system may use several file systems. A file system is a removable disk and/or a partition on a disk. A file system can most easily be thought of as a subtree of the root "/" directory. Generally, the file system in which the root "/" directory is located is referred to as the root file system.

Figures 1, 2A, 2B, 2C:
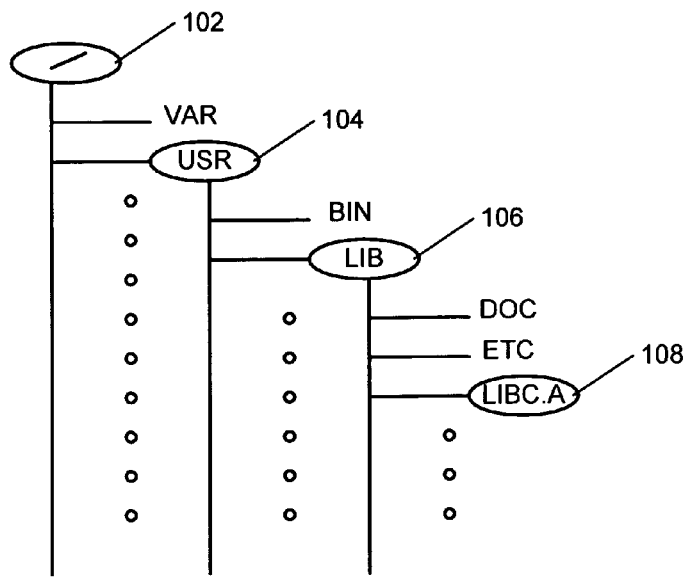
FIG. 1 is a partial directory tree.
FIGS. 2a, 2b and 2c depict directories.
Figures 3, 4:
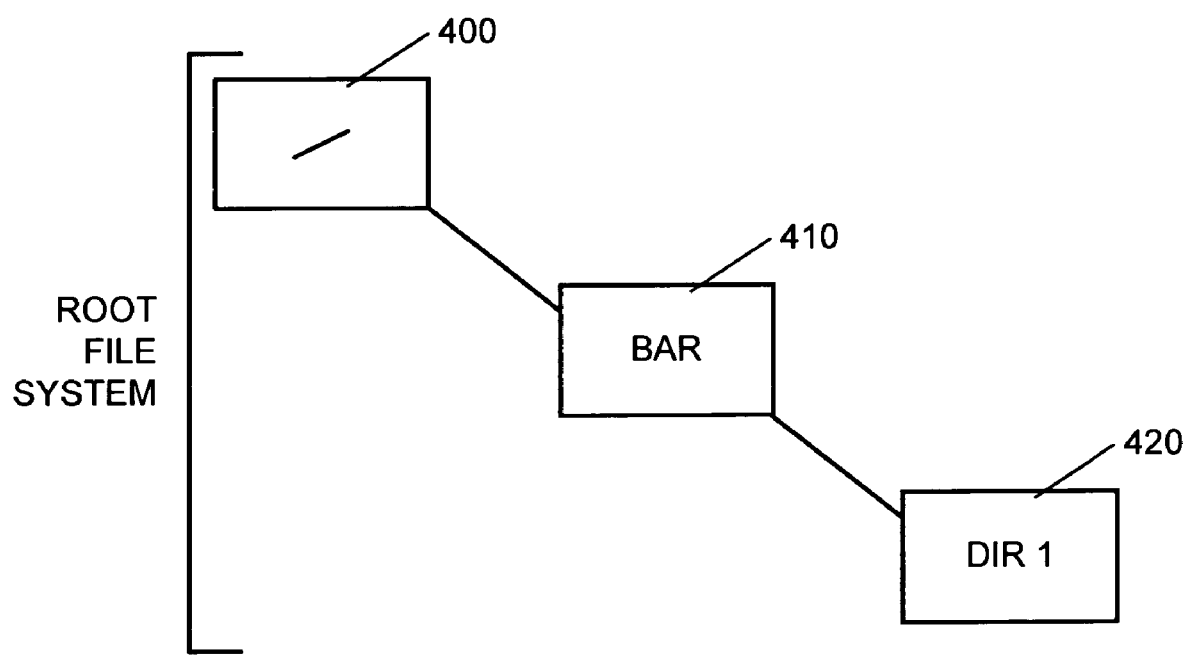
FIG. 3 illustrates directory name lookup cache (DNLC) entries.
FIG. 4 illustrates a root file system.

FIG. 4 illustrates a root file system. The root file system contains root directory "/" 400 and directories bar 410 and dir1 420. Root directory "/" 400 and directory bar 410 may contain files and other directories stored therein. However, directory dir1 420 is an empty directory.

Root file systems ordinarily contain files that are used by the operating system itself, and must be available at all times. Other file systems are removable. Removable file systems are attached to, or mounted on the root file system. Typically, an empty directory is created in the root file system as a mount point for a removable file system. In this example, directory "/bar/dir1" is a mount point within the root file system. Note that there may be more than one mount point in a root file system. Further, there may be mount points on removable file systems.

Figure 5:
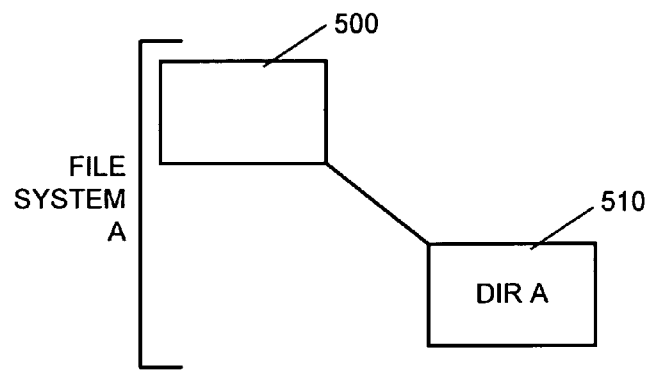
FIG. 5 depicts a mountable file system.

FIG. 5 depicts a mountable (removable) file system A. File system A is not necessarily mounted on startup. File system A contains root directory 500 and dirA 510. Root directory 500 does not have a name. Consequently, dirA cannot be accessed. However, if file system A is mounted at a mount point, dirA will become accessible.

Figure 6:
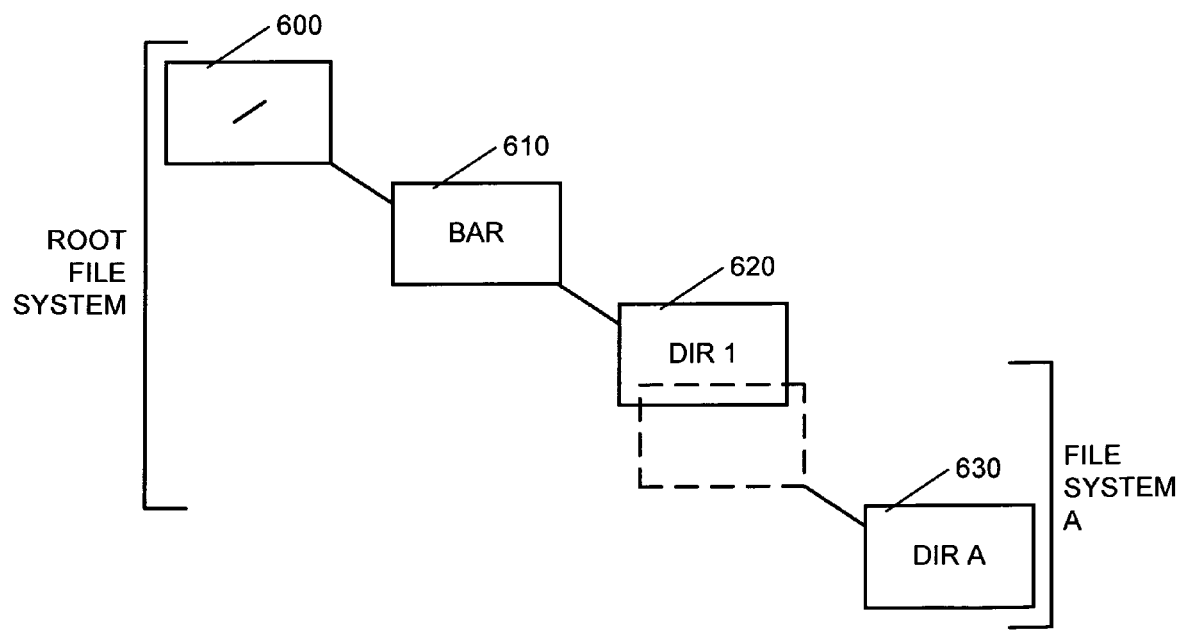
FIG. 6 depicts file system mounted at a mount point.

FIG. 6 depicts file system A mounted at mount point /bar/dir1. In FIG. 6, the root directory of file system A overlays the mount point within the root file system and takes on the name of the mount point. Hence, directory dirA may be accessed by typing in the pathname "/bar/dir1/dirA".

Mounting file systems on other file systems obviates the need for users to be concerned with the drive on which a file is located, as is customary in MS-DOS (Microsoft disk operating system) or Windows. In UNIX, all the file systems used in the system appear to be one whole file system that is hierarchically arranged from the root directory ("/") to a user file.

Since different file systems may be attached to a root file system, entries in the MENC are preferably made both statically and dynamically. Particularly, frequently-used files that will always be part of the computer system (e.g., files in the root file system) as well as files from certain removable file systems may have their pathnames entered statically in the MENC. Other frequently-used files may have their pathnames be dynamically entered into the MENC. Static entries remain in the MENC until the file system or systems within which the files are contained are unmounted or removed from the system whereas dynamic entries are constantly updated to reflect the most commonly used files in the system. The number of static and dynamic entries may individually be configured by the system administrator.

There is a plurality of methods that may be used to make static MENC entries. For example, the system administrator may specify static entries via an extended attribute of a root directory of a file system. An extended attribute is additional non-user data that is associated with a file system directory/file. An extended attribute is different from traditional directory/file attributes such as ownerships, access permission etc. In most UNIX-based systems, very few restrictions are placed on contents of extended attributes. Hence, any application program may attach an extended attribute to any directory/file. The attached extended attribute may or may not have meaning outside of that application.

Figure 7:
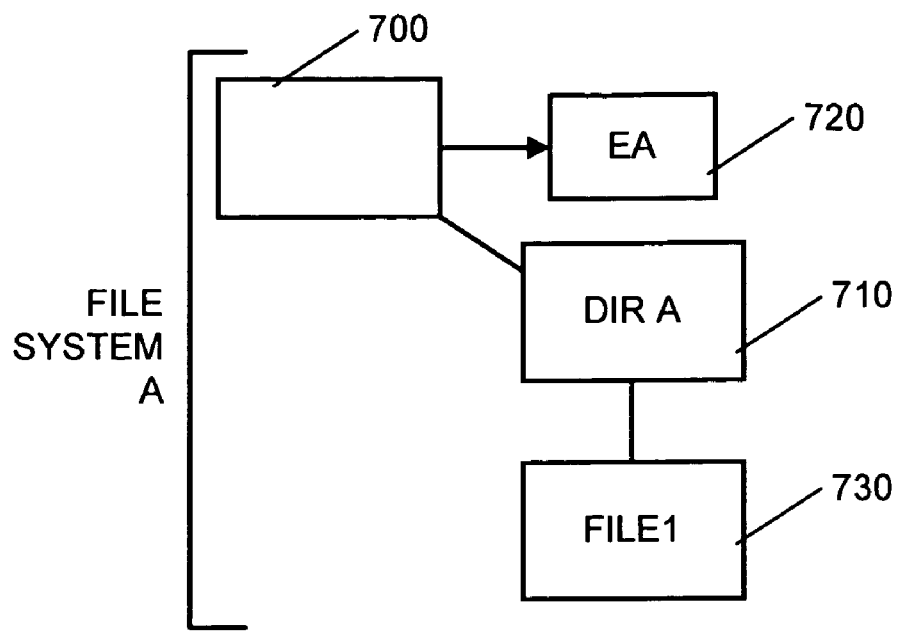
FIG. 7 illustrates a conceptual view of an extended attribute.
Figure 8:
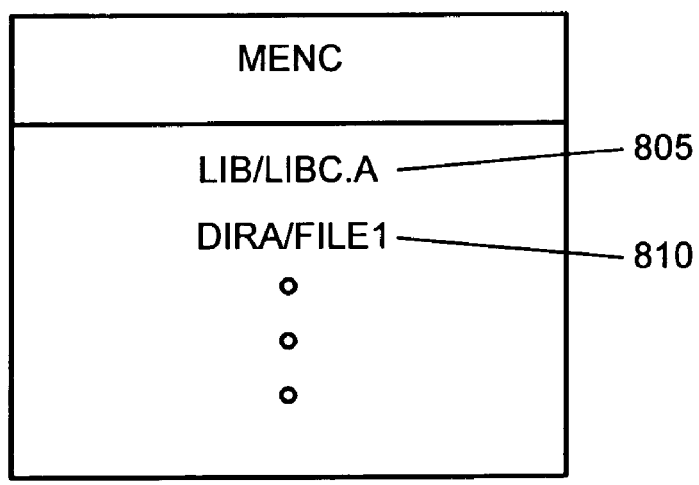
FIG. 8 is a representative extended attribute file.

FIG. 7 illustrates a conceptual view of an extended attribute. In the figure, extended attribute 720 is shown to be associated with root directory 700 of file system A. In modern file systems, as mentioned above, an extended attribute is simply additional data (commonly name/value pairs) that is attached to a file system object. An extended attribute may be stored as a separate file or through some other mechanism. Thus, the system administrator may expressly enter pathnames of files that reside in the removable file system that are to be entered in the MENC. For example, the system administrator may enter the pathname of "file1" 730 in directory "dirA" 710 in the extended attribute file 720. The entry may be "dirA/file1", a pathname relative to the mounting directory. The content of a representative extended attribute file is shown in FIG. 8.

When file system A is mounted at mount point "dir1" 620 (see FIG. 6), the system will check to see whether there is an MENC extended attribute associated with the directory 700. If so, the system will access the MENC extended attribute file 720 and retrieve all pathnames stored therein. The system will also obtain the inode number of the files from the disk. The pathnames and their cross-referenced inode number will then be entered in the MENC. The pathnames in the MENC extended attribute file are relative (e.g., relative to the mounting directory as shown in FIG. 7) since the removable file systems may be mounted at any mount point. However, the pathname entries in the MENC are absolute (see FIG. 14).

Pathnames entered into the MENC using the MENC extended attribute file form of entry are persistent entries. That is, the pathnames are permanently stored with the file system. Hence, each time the file system is mounted the stored pathnames will be entered into the MENC. Of course, when the file system is unmounted (i.e., removed), the entries may be deleted or allowed to be written over; and thus, they are static.

Another method of making entries in the MENC is to use a mount command option. Particularly, when the system administrator is mounting a file system, the system administrator may make entries into the MENC. These entries are also static since they will remain in the MENC until the file system is unmounted. FIG. 9 displays a mount command with an option to enter a pathname of a file into the MENC. Here, the system administrator is mounting a file system that resides in logical volume lv00 (statement 920) at mount point "/bar/dir1" (statement 925). Statement 915 is the relative pathname of a file that needs to be entered in the MENC. Statement 910 is an option that signals to the system that there is at least one pathname to be entered into the MENC and statement 905 is the mount command. Note that more than one pathname may be entered at the command line, so long as they are separated by a comma (,).

A logical volume is an abstraction used by a file management system to store a particular piece of data (as well retrieve the data) across a plurality of physical storage systems or disks. A logical volume manager LVM correlates logical volumes to physical volumes. A description of an LVM may be found in APPARATUS AND METHOD OF CREATING A MIRRORING MAP FOR USE WITH DIFFERENT PIECES OF DATA, filed on Dec. 17, 2001, having Ser. No. 10/015,223 and assigned to Internal Business Machines (IBM) Corporation, the disclosure of which is herein incorporated by reference.

This method of making entries into the MENC is temporary since the entries are only valid during the present mount instance. In other words, each time the file system is mounted or while the file system is being mounted, the system administrator has to specifically enter the pathnames of the files into the MENC. Note that since pathnames are entered into the MENC during a file system mount, the inode number may then be obtained from the disk and entered into the MENC at that time.

At any time, the system administrator may enter a pathname into the MENC. FIG. 10 is a command to enter a pathname into the MENC. Specifically, the directory represented by statement 1010 is entered into the MENC using the command in statement 1005. In this case, it is not important that the file system in which the file is contained be actually mounted on the system; although it is preferable. Further, just as in the case of the mount command option, this method of making entries into the MENC is temporary as these entries become invalid once the file system is unmounted.

When a pathname of a file is entered into the MENC using the above-described method, it will not be automatically cross-referenced with its inode number. Particularly, the first time an inode number is looked up into the MENC it will not be found. Thus, the DNLC or disk may have to be consulted to obtain the inode number. Once the inode number is obtained from the DNLC or from the disk, it will be entered into the MENC. The invention is implemented in this manner for performance reasons. That is, if a static entry is never looked up in the MENC, the overhead associated with obtaining the inode number of the file from either the DNLC or the disk will not be incurred.

FIGS. 11 and 12 illustrate commands that may be used at any time to make persistent entries into the MENC through the MENC extended attribute file. The command in FIG. 11 indicates the mount point (statement 1120) of a mounted file system and a request to add the entry (statement 1115) into the MENC (statement 1105). It also makes the entry persistent (statement 1110) by storing the pathname in the MENC extended attribute associated with the root directory of the file system.

The command in FIG. 12, on the other hand, specifies a logical volume (statement 1220) that contains an unmounted file system. The command makes the entry (statement 1215) persistent (statement 1210) into the MENC (statement 12051 by causing the LVM to store the pathname in the MENC extended attribute associated with the root directory of the file system. Note that pathname entries will not be made into the MENC until the file system is mounted. Note also that a mount point is not specified. Thus, when the file system is mounted in the future, the mount point will be pre-pended to the persistent relative pathnames and added into the MENC. As before, those MENC entries will be deleted or allowed to be written over once the file system is unmounted.

Just as in the case of making entries into the MENC, entries may be removed at anytime from the MENC. FIG. 13 depicts a MENC command with a remove option. In FIG. 13, the pathname (statement 1315) is to be removed from the MENC (statement 1305) using the remove option (statement 1310).

As mentioned above, entries in the MENC may be made dynamically. In this case, a counter and a timer may be used for each file whose inode number is looked up in the DNLC. For example, if the inode number of a file is looked up 20 times within one second, the pathname and the inode number of the file may be dynamically entered into the MENC. In this case, a one-second sliding window may be used. Note that the actual implementation for the dynamic entries is unimportant so long as when the inode number of a file is looked up a certain number of times (any threshold number may be used so long as it satisfies a particular application) in the DNLC within a certain time period (again any threshold number that satisfies an application may be used) its pathname and inode number may be entered into the MENC. A least recently used (LRU) algorithm may be used to allow stale entries to be written over when the allocated space for the dynamic entries is used up.

FIG. 14 displays representative entries into the MENC. Note that in the extended attribute shown in FIG. 8, the pathnames 805 and 810 are relative. In FIG. 14, the pathname entries (i.e., pathnames 1405 and 1410) are absolute.

Figure 15:
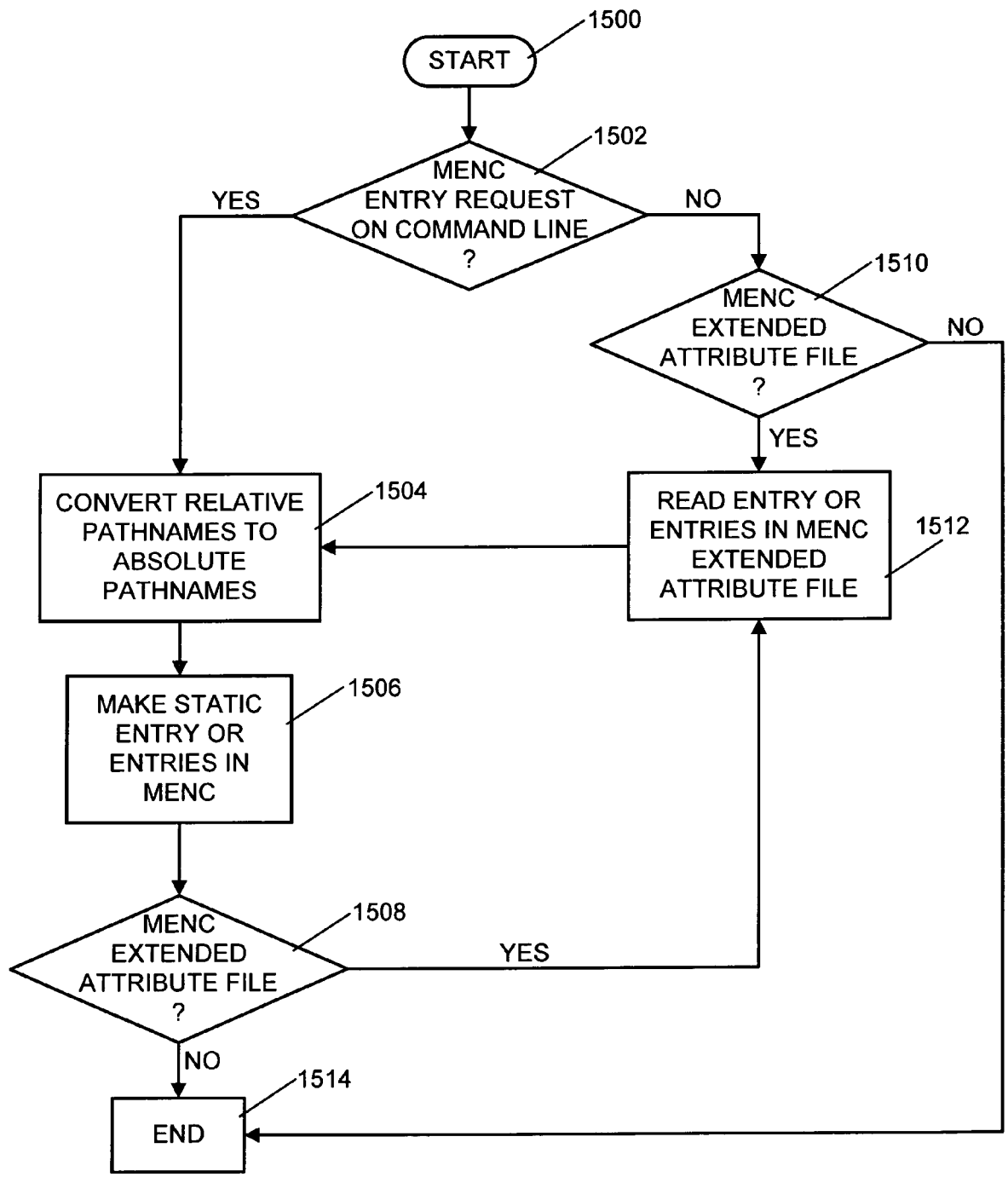
FIG. 15 is a flow chart of a process that may be used to make static entries in to the MENC at mount time.

FIG. 15 is a flow chart of a process that may be used to make static entries in to the MENC at mount time. The process starts when a file system is being mounted (step 1500. Upon starting, a check will be made to determine whether there is at least one MENC entry request on the mount command line. If so, the relative pathnames on the command line will be converted to absolute pathnames before the entries are made into the MENC (steps 1502, 1504, 1506). Then a check will be made to determine whether there is an MENC extended attribute file (step 1508). If not the process ends (step 1514).

If there is not an MENC entry request on the command line (step 1502) or after static entries have been made into the MENC due to entry requests on the command line (step 1506), a check will be made to determine whether there is an MENC extended attribute file (steps 1508 and 1510). If so, the file is opened and the entries in the file read (step 1512) and the process jumps to step 1504. If not, the process ends (1514).

Figure 16:
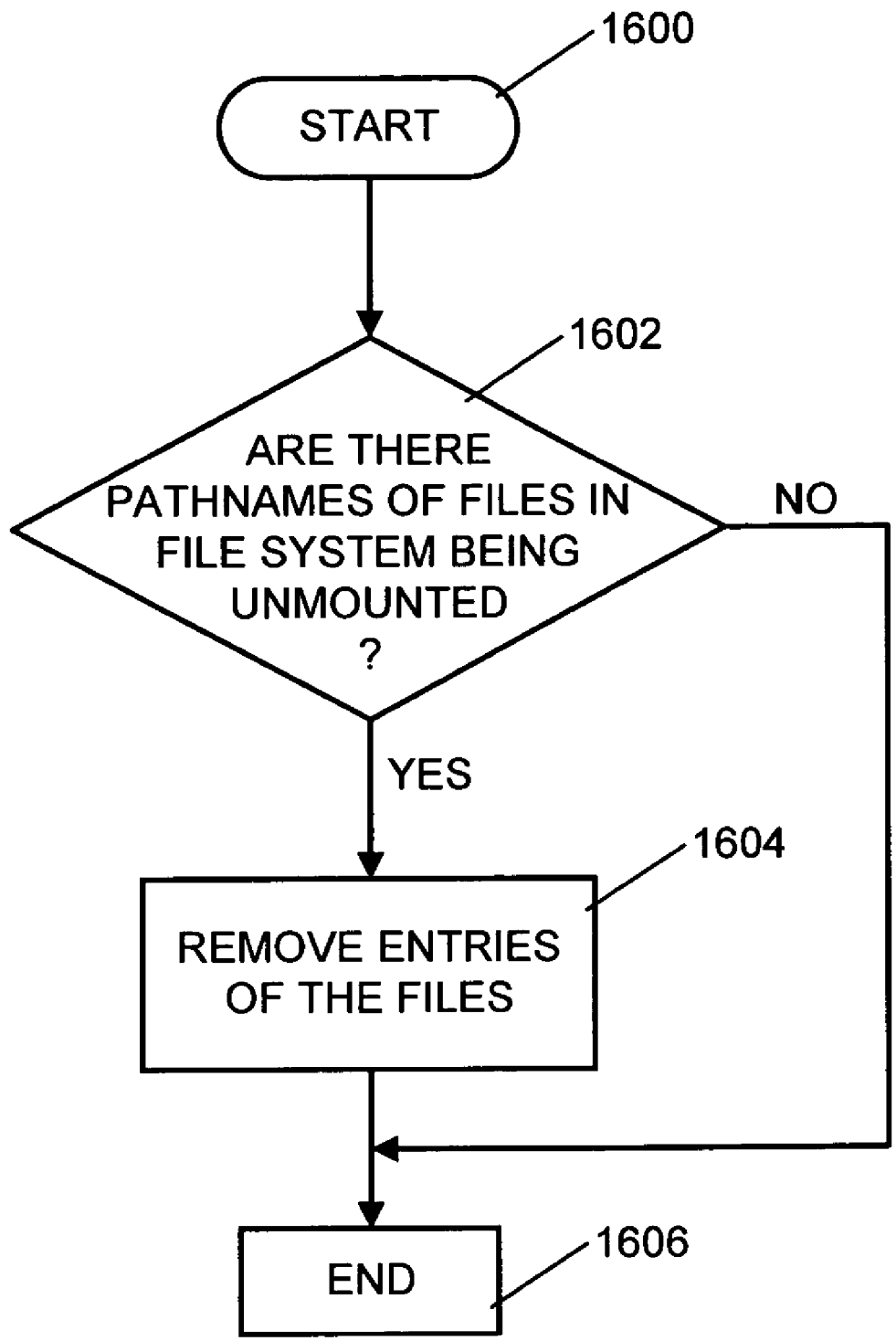
FIG. 16 is a flowchart of a process that may be used when a file system is being dismounted.

FIG. 16 is a flowchart of a process that may be used when a file system is being unmounted. The process starts when a file system is being unmounted (step 1600). Upon starting, the process will check to determine whether there are pathnames of files that reside on the file system that is being unmounted in the MENC. If so, the process will delete all those pathnames and end. Otherwise the process will just end (steps 1602, 1604 and 1606).

Figure 17:
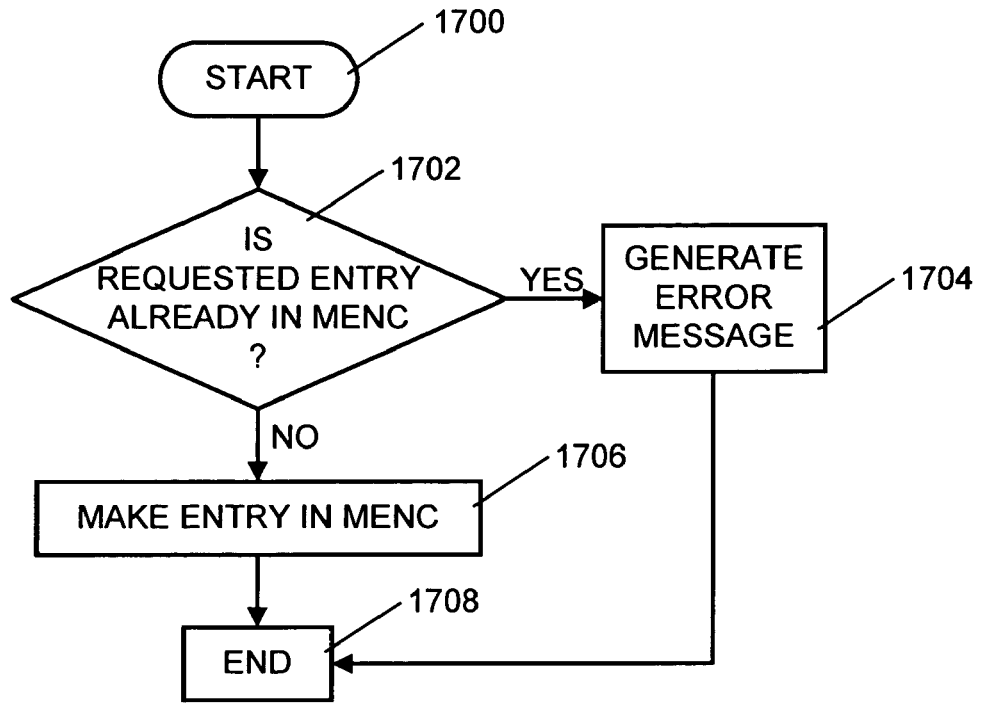
FIG. 17 is a flowchart of a process that may be used to make entries into the MENC when an MENC entry request command is used.

FIG. 17 is a flowchart of a process that may be used to make entries into the MENC when an MENC entry request command is used. The process starts once the command is received (step 1700). Then, a check is made to determine whether the pathname is already into the MENC. If so, an error message is generated before the process ends (steps 1702, 1704 and 1708). If the pathname is not already in the MENC, it is then entered and the process ends (steps 1702, 1706 and 1708).

Figure 18:
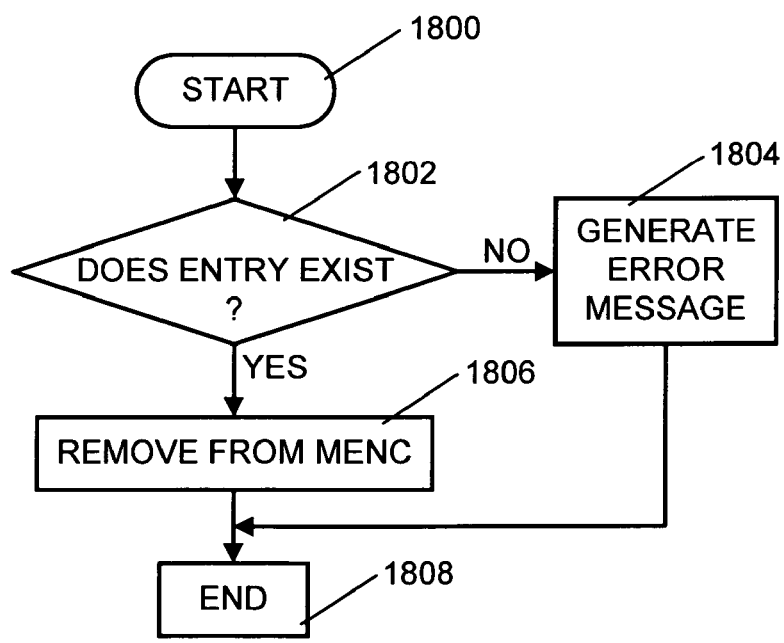
FIG. 18 is a flowchart of a process that may be used when an entry removal command is used.

FIG. 18 is a flowchart of a process that may be used when an entry removal command is used. The process starts when the command is received (step 1800). Then a check is made to determine whether the pathname that is to be removed from the MENC is in the MENC. If so, it is removed and the process ends (steps 1802, 1806 and 1808). If the pathname is not in the MENC, an error message is generated before the process ends. (steps 1802, 1804 and 1808).

Figure 19:
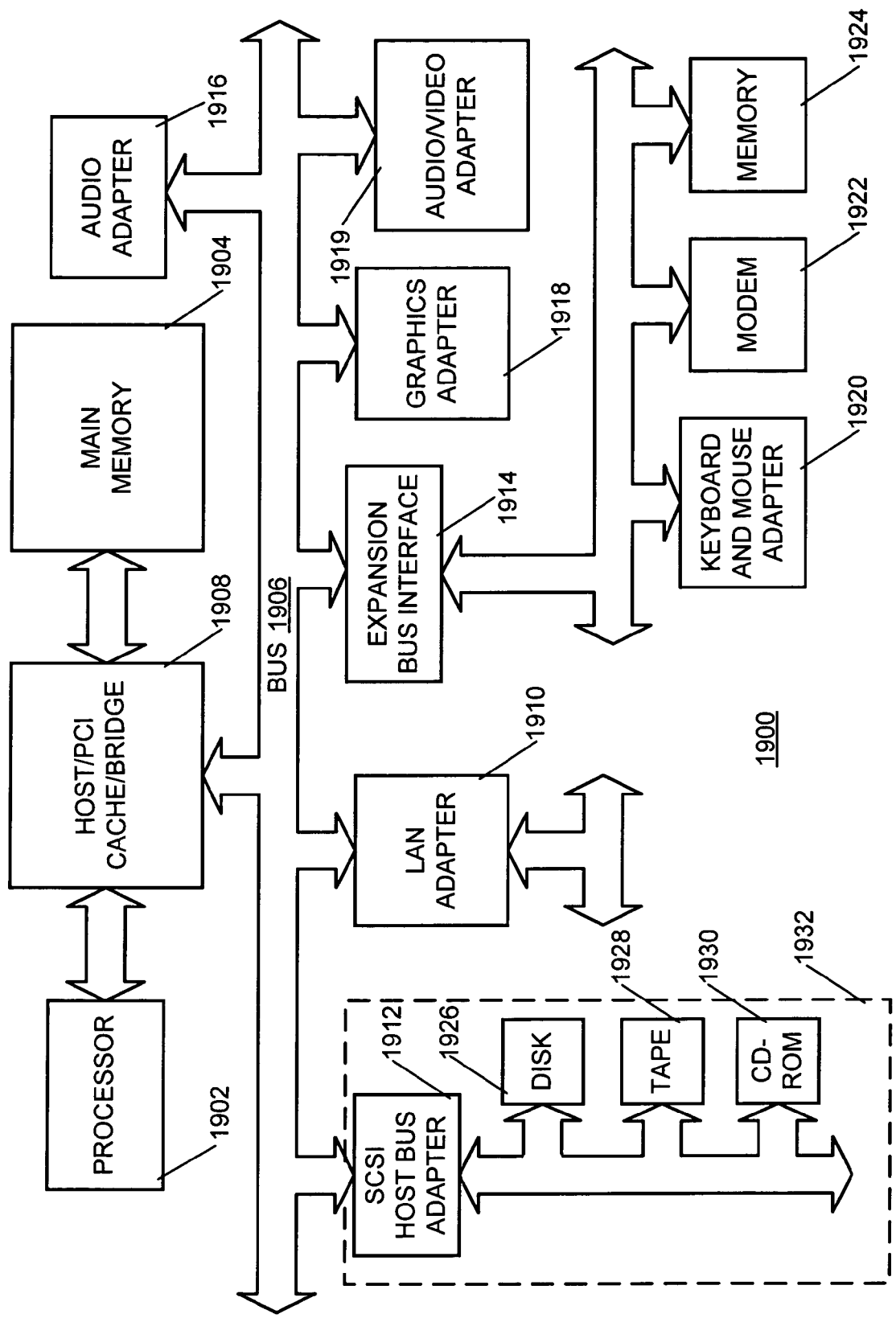
FIG. 19 is a block diagram illustrating a data processing system in which the present invention may be implemented.

FIG. 19 is a block diagram illustrating a data processing system in which the present invention may be implemented. Data processing system 1900 employs a peripheral component interconnect (PCI) local bus architecture. Although the depicted example employs a PCI bus, other bus architectures such as Accelerated Graphics Port (AGP) and Industry Standard Architecture (ISA) may be used. Processor 1902 and main memory 1904 are connected to PCI local bus 1906 through PCI bridge 1908. PCI bridge 1908 also may include an integrated memory controller and cache memory for processor 1902. Additional connections to PCI local bus 1906 may be made through direct component interconnection or through add-in boards. In the depicted example, local area network (LAN) adapter 1910, SCSI host bus adapter 1912, and expansion bus interface 1914 are connected to PCI local bus 1906 by direct component connection. In contrast, audio adapter 1916, graphics adapter 1918, and audio/video adapter 1919 are connected to PCI local bus 1906 by add-in boards inserted into expansion slots. Expansion bus interface 1914 provides a connection for a keyboard and mouse adapter 1920, modem 1922, and additional memory 1924. Small computer system interface (SCSI) host bus adapter 1912 provides a connection for hard disk drive 1926, tape drive 1928, and CD-ROM drive 1930. Typical PCI local bus implementations will support three or four PCI expansion slots or add-in connectors.

An operating system runs on processor 1902 and is used to coordinate and provide control of various components within data processing system 1900 in FIG. 19. The operating system may be a commercially available operating system, such as AIX available from IBM Corporation. "AIX" is a trademark name of IBM Corporation. An object oriented programming system such as Java may run in conjunction with the operating system and provide calls to the operating system from Java programs or applications executing on data processing system 1900. "Java" is a trademark of Sun Microsystems, Inc. Instructions for the operating system, the object-oriented operating system, and applications or programs are located on storage devices, such as hard disk drive 1926, and may be loaded into main memory 1904 for execution by processor 1902.

Those of ordinary skill in the art will appreciate that the hardware in FIG. 19 may vary depending on the implementation. Other internal hardware or peripheral devices, such as flash ROM (or equivalent nonvolatile memory) or optical disk drives and the like, may be used in addition to or in place of the hardware depicted in FIG. 19. Also, the processes of the present invention may be applied to a multiprocessor data processing system.

The description of the present invention has been presented for purposes of illustration and description, and is not intended to be exhaustive or limited to the invention in the form disclosed. Many modifications and variations will be apparent to those of ordinary skill in the art. For example, virtual inode (v-node) and v-node numbers may be used instead of inode and inode numbers. Hence, the embodiment was chosen and described in order to best explain the principles of the invention, the practical application and to enable others of ordinary skill in the art to understand the invention for various embodiments with various modifications as are suited to the particular use contemplated.

What is claimed is:

1. A method of providing a performance-enhancing way of accessing frequently-accessed file system objects comprising:
  determining at least one frequently-accessed file system object in a file system upon mounting the file system at a mount point on a computer system, each file system object having a pathname and an inode number, the inode number for locating the file system object on a storage system, wherein determining includes obtaining from an extended attribute file a list of pathnames to be entered into the memory system, the extended attribute file being associated with the mounted file system;
  entering the pathname of the at least one file system object into a memory system; and
  cross-referencing the pathname of the at least one file system object in the memory system with its inode number thereby enabling the inode number to be obtained with one memory access.

2. The method of claim 1 wherein the pathnames in the extended attribute file are relative to the mount point.

3. A computer program on a computer readable medium for enhancing performance of a system when frequently-accessed file system objects are being accessed comprising:
   code means for determining at least one frequently-accessed file system object in a file system upon the file system being mounted at a mount point on the system, each file system object having a pathname and an inode number, the inode number for locating the file system object on a storage system, wherein the determining code means includes code means for obtaining from an extended attribute file a list of pathnames to be entered into the memory system, the extended attribute file being associated with the mounted file system;
   code means for entering the pathname of the at least one file system object into a memory system; and
   code means for cross-referencing the pathname of the at least one file system object in the memory system with its i-node number thereby allowing the inode number to be obtained with one memory access.

4. The computer program of claim 3 wherein the pathnames in the extended attribute file are relative to the mount point.

5. A system comprising:
   at least one storage system for storing code data and
   at least one processor for processing the code data to determine at least one frequently-accessed file system object in a file system upon the file system being mounted at a mount point on the system, each file system object having a pathname and an inode number, the inode number for locating the file system object on a storage system, to enter the pathname of the at least one file system object into a memory system, and to cross-reference the pathname of the at least one file system object in the memory system with its inode number thereby allowing the inode number to be obtained with one memory access, wherein the code data is further processed to obtain from an extended attribute file a list of pathnames to be entered into the memory system, the extended attribute file being associated with the mounted file system.

6. The system of claim 5 wherein the pathnames in the extended attribute file are relative to the mount point.

* * * * *